US012699275B2

(12) United States Patent
Mambourg

(10) Patent No.: US 12,699,275 B2
(45) Date of Patent: Aug. 4, 2026

(54) LASER-BEAM COMBINATION WITH DUAL-SUBSTRATE DICHROIC FILTERS

(71) Applicant: Attalon Solutions, Inc., Bloomfield, CT (US)

(72) Inventor: Joseph R. Mambourg, Spring Lake, MI (US)

(73) Assignee: Attalon Solutions, Inc., Bloomfield, CT (US)

( * ) Notice: Subject to any disclaimer, the term of this patent is extended or adjusted under 35 U.S.C. 154(b) by 330 days.

(21) Appl. No.: 18/483,787

(22) Filed: Oct. 10, 2023

(65) Prior Publication Data

US 2025/0116875 A1 Apr. 10, 2025

(51) Int. Cl.
G02B 27/14 (2006.01)

(52) U.S. Cl.
CPC ......... G02B 27/141 (2013.01); G02B 27/145 (2013.01)

(58) Field of Classification Search
USPC ....................................................... 359/634
See application file for complete search history.

(56) References Cited

U.S. PATENT DOCUMENTS

| | | | | |
|---|---|---|---|---|
| 6,163,409 A | * | 12/2000 | Uchiyama | ............ G02B 27/141 |
| | | | | 359/634 |
| 9,434,145 B2 | | 9/2016 | Erdogan et al. | |
| 2011/0069387 A1 | | 3/2011 | Iida | |
| 2022/0317467 A1 | | 10/2022 | Danziger | |
| 2023/0393408 A1 | | 12/2023 | Glebov | |

* cited by examiner

*Primary Examiner* — Dung T Nguyen

(74) *Attorney, Agent, or Firm* — McDonnell Boehnen Hulbert & Berghoff LLP

(57) ABSTRACT

A dual-substrate dichroic beam combiner includes two substrates, and a dichroic thin-film filter coated at a nominally planar interface between the substrates. The filter is configured to combine, into a combined laser beam, two input laser beams that are incident on the filter of the combiner from opposite respective sides thereof. One input beam is transmitted by the combiner, while the other input beam is reflected. The substrates are configured to, when heated by absorption of the input laser beams in the filter, form a lens for each of the input laser beams. The lens is either (a) a negative lens for each of the input laser beams or (b) a positive lens for each of the input laser beams. The combiner thereby reduces or eliminates focusing discrepancies between the two input beams, in the combined beam, as compared to a conventional single-substrate dichroic beam combiner.

20 Claims, 5 Drawing Sheets

LASER-BEAM COMBINATION WITH DUAL-SUBSTRATE DICHROIC FILTERS

TECHNICAL FIELD OF THE INVENTION

The present invention relates to spectral beam combination, that is, the combination of multiple laser beams each characterized by a different respective wavelength. The present invention relates in particular to combining multiple high-power laser beams with dichroic filters to achieve a combined laser beam with an average power of several kilowatts (kW) or tens of kW.

DISCUSSION OF BACKGROUND ART

A variety of laser applications rely on high laser power, particularly in materials processing and laser machining. As compared to conventional materials processing/machining tools, lasers are uniquely capable of highly local energy delivery and can thus perform processing and machining tasks with greater precision than conventional tools, and in many cases also with greater speed and convenience. As such, high-power laser beams are used to, e.g., weld, cut, sinter, and harden metals in a clean, precise, and efficient fashion. These processes may benefit from average laser powers in the range of several to many kW. It may be impossible to obtain sufficient laser power from a single laser source. For example, the average power of a high-power fiber laser is typically no more than a few kW, and generally less than one kW for single-mode fiber lasers. Higher laser powers may be achieved by combining the output of several individual lasers.

There are two classes of beam combination techniques: coherent beam combination and spectral beam combination. In coherent beam combination, multiple laser beams of the same wavelength are combined. The input beams must be mutually coherent with their relative phases controlled to ensure constructive interference between the input beams. In spectral beam combination, the input beams have different wavelengths. Spectral beam combination therefore does not require controlling the relative phases of the input beams. Thus, spectral beam combination may offer a simpler alternative to coherent beam combination in applications that do not require the laser light to be monochromatic.

Spectral beam combination utilizes a wavelength-sensitive beam combiner, such as a prism, a diffraction grating, or one or more dichroic filters, to combine multiple laser beams of different respective wavelengths. Prism- and grating-based spectral beam combination are conceptually similar. Conventionally, a prism or diffraction grating is used to combine input beams of different respective wavelengths by directing the input beams onto the prism/grating at respective input angles that cooperate with wavelength-sensitive deflection to overlay the deflected beams on each other. In dichroic-filter-based spectral beam combination, two input beams are combined on a single dichroic beam combiner, and each additional input beam (if any) is added into the combined laser beam on a respective subsequent dichroic beam combiner. Each dichroic beam combiner includes a dichroic thin-film interference filter that reflects one of the two input beams and transmits the other. The interference filter is typically a high-pass or low-pass filter, and the wavelengths of the two input beams must be on opposite sides of the cut-off wavelength between the interference filter being transmissive and reflective.

Commonly, when using spectral beam combination to generate a high-power laser beam, all input beams are generated by the same type of laser, but each individual laser is tuned to a different wavelength within the gain curve of the laser gain medium. An ytterbium-doped fiber laser, for example, may have a gain curve extending approximately from 1030 nanometers (nm) to 1085 nm. The number of laser beams, from the same type of laser, that can be combined with dichroic filters is limited by the width of the laser gain curve and the transition width between transmissive and reflective portions of the transmission curve of each dichroic filter. For a 10 nm wide transition between the transmissive and reflective portions of the transmission curve, it may be realistic to combine up to 5 or 6 laser beams generated by ytterbium-doped fiber lasers in the wavelength range from 1030 to 1085 nm. A much higher number of laser beams can be combined on a prism or grating. However, as compared to dichroic filters, prism/grating-based systems are usually bigger, heavier, more expensive, and more sensitive to alignment. Dichroic filters may therefore be the preferred solution when the desired output power can be achieved from a smaller number of input beams.

SUMMARY OF THE INVENTION

Disclosed herein is a dual-substrate dichroic beam combiner and associated beam combination systems that overcome heating of the dichroic beam combiners caused by absorption of laser light in the dichroic filters. Such heating otherwise limits the combined power that can be achieved. A conventional dichroic beam combiner is a substrate with a thin-film interference filter coated on one surface. When the interference filter is subjected to high laser power, such as multi-kW-level average laser power, even a relatively low level of laser-light absorption in the interference filter is sufficient to significantly heat the substrate. It is impossible to avoid low-level absorption, even with careful design, as some weak absorption is intrinsic to the dielectric materials in such filters. The interference filter is very thin. Yet, at high laser powers, the heating is sufficient to induce thermal expansion of the substrate and/or non-uniform changes in its refractive index.

Using a fused silica substrate as an example, thermal expansion and a heating-induced increase in the refractive index cause the conventional dichroic beam combiner to work as a positive lens for the transmitted input beam and as a negative lens for the reflected input beam. It is therefore impossible, or at least challenging, to collimate the combined beam or bring the combined beam to a single focus.

In the presently disclosed dual-substrate dichroic beam combiner, an interference filter is sandwiched between two substrates. The transmitted input beam passes through both substrates, while the reflected input beam passes through one of the substrates twice. Heating caused by laser-light absorption in the interference filter affects both substrates in a similar fashion, such that the dichroic beam combiner works as either a positive lens for both the transmitted and the reflected input beams or, when characterized by a negative thermo-optic coefficient dn/dT, a negative lens for both the transmitted and the reflected input beams. The dual-substrate dichroic beam combiner may be configured to impose the same focusing power on both input beams such that, when the input beams are incident on the dual-substrate dichroic beam combiner as collimated beams, the input beams converge at the same rate in the combined beam propagating away from the dual-substrate dichroic beam combiner.

Spectral beam combination of three or more collimated input beams can be achieved by arranging two or more instances of the disclosed dual-substrate dichroic beam combiner in a series. In such beam combination systems, a re-collimating optical element is inserted between each pair of adjacent dichroic beam combiners of the series. Such re-collimating optical elements ensure that not only the first, but every dichroic beam combiner of the series receives two collimated input beams.

In one aspect of the invention, a dichroic beam combiner for combining two laser beams includes two substrates, and a dichroic thin-film filter coated at a nominally planar interface between the substrates. The dichroic thin-film filter is transmissive in a transmission-wavelength-range and reflective in a reflection-wavelength-range, whereby the dichroic thin-film filter is configured to combine, into a combined laser beam, first and second input laser beams that (a) have wavelengths in the transmission-wavelength-range and reflection-wavelength-range, respectively, and (b) are incident on the dichroic thin-film filter of the dichroic beam combiner from opposite respective sides thereof. The substrates are configured to, when heated by absorption of the input laser beams in the dichroic thin-film filter, form a first lens for the first input laser beam and a second lens for the second input laser beam. The first and second lenses are either (a) both negative or (b) both positive.

BRIEF DESCRIPTION OF THE DRAWINGS

The accompanying drawings, which are incorporated in and constitute a part of the specification, schematically illustrate preferred embodiments of the present invention, and together with the general description given above and the detailed description of the preferred embodiments given below, serve to explain principles of the present invention.

DETAILED DESCRIPTION OF THE INVENTION

Figure 1:
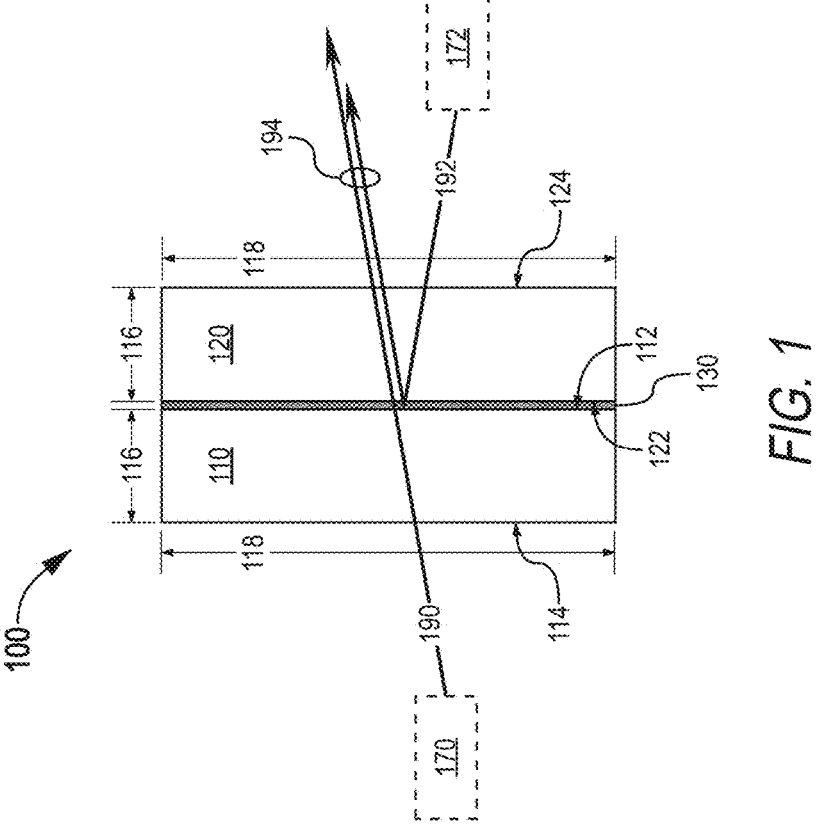
FIG. 1 illustrates a dual-substrate dichroic beam combiner including two substrates, and a dichroic filter disposed at an interface between the two substrates, according to an embodiment.

Referring now to the drawings, wherein like components are designated by like numerals, FIG. 1 illustrates one dual-substrate dichroic beam combiner 100. Combiner 100 includes two adjacent substrates 110 and 120 and a dichroic filter 130. Dichroic filter 130 is disposed at an interface between substrates 110 and 120. Substrates 110 and 120 are identical in material, size, and shape. Substrates 110 and 120 form mirror images of each other, as reflected in the interface therebetween. Combiner 100 is configured to combine two input beams 190 and 192 into a combined beam 194. Filter 130 absorbs a small fraction of input beams 190 and 192, which results in heating of combiner 100. The positioning of filter 130 between substrates 110 and 120 serves to prevent laser-induced heating of filter 130 from inducing focusing discrepancies between input beams 190 and 192 in combined beam 194. Combiner 100 is therefore useful for generation of a combined laser beam with a particularly high average power.

Substrate 110 has two opposite-facing surfaces 112 and 114. Similarly, substrate 120 has two opposite-facing surfaces 122 and 124. Filter 130 is disposed at the interface between surfaces 112 and 122. FIG. 1 depicts combiner 100 in a nominal state when not heated by the laser radiation of input beams 190 and 192. In this nominal state, substrates 110 and 120 are planar and, thus, the interface between substrates 110 and 120 is planar. Herein, the term "nominal" refers to situations where there is no laser-induced heating, such as when input beams 190 and 192 are off. The term "nominally" is used herein to refer to characteristics of a component when the component is in a "nominal" state.

Substrates 110 and 120 are transmissive at the wavelengths of input beams 190 and 192. Substrates 110 and 120 may be substantially transparent at the wavelengths for input beams 190 and 192, for example with transmission coefficients of at least 80%, at least 90%, or at least 95% at these wavelengths. Substrates 110 and 120 may be made of fused silica, another optical glass, or a crystal such as sapphire. These materials are suitable when the wavelengths of input beams 190 and 192 are in the range between 1030 and 1080 nm, for example. When the wavelengths of input beams 190 and 192 are in the region around 2 micrometers, silicon or zinc selenide may be a more suitable material for substrates 110 and 120. Each of substrates 110 and 120 has a nominal thickness 116. Thickness 116 may be in the range between 0.4 and 10 millimeters (mm), depending on the substrate material. In one implementation, substrates 110 and 120 are, nominally, circular planar disks with a nominal diameter 118. Diameter 118 may be in the range between 5 and 50 mm. Substrates 110 and 120 may be non-circular, for example square. Regardless of their shape, substrates 110 and 120 are arranged such that the outlines of their respective projections onto the interface therebetween are identical in both shape and position. For example, in the case of substrates 110 and 120 being circular planar disks, these disks are concentric.

Filter 130 is a thin-film interference filter including multiple layers. In one embodiment, all layers of filter 130 are initially coated onto a single one of surfaces 112 and 122. In another embodiment, one or more layers of filter 130 are initially coated onto surface 112, and the remaining layers of filter 130 are initially coated onto surface 122. Surface 112 (optionally with all or some layers of filter 130 initially coated thereon) may be bonded by optical contacting to substrate 120 (optionally with all or some layers of filter 130 initially coated thereon).

Filter 130 is transmissive in one wavelength range and reflective in another wavelength range. Herein, an element may be considered "transmissive" when characterized by a transmission coefficient that exceeds 50%. Similarly, an element may be considered reflective when characterized by a transmission coefficient of less than 50%. In certain embodiments, filter 130 is characterized by (a) a transmission coefficient of at least 90%, e.g., 95% or more, in a transmission-wavelength-range, and (b) a transmission coefficient of less than 10%, e.g., no more than 5%, in a reflection-wavelength-range. In one implementation, filter 130 is a high-pass filter, i.e., with the transmission-wavelength-range at longer wavelengths than the reflection-wavelength-range. In another implementation, filter 130 is a low-pass filter. Filter 130 may also be a bandpass filter (having two reflection-wavelength-ranges) or a notch filter (having two transmission-wavelength-ranges). For the present purpose of spectral beam combination, though, a high-pass or low-pass filter may be the most cost-effective solution.

In operation, input laser beams 190 and 192 are incident on combiner 100 from opposite sides. Input beam 190 is incident on surface 114 of substrate 110. The wavelength of input beam 190 is in the transmission-wavelength-range of filter 130 and is therefore transmitted by filter 130. Input beam 192 is incident on surface 124 of substrate 120 and has a wavelength in the reflection-wavelength-range of filter 130. Input beam 192 is therefore reflected by filter 130. Input beams 190 and 192 are aligned to co-propagate after transmission/reflection by filter 130, thereby forming combined laser beam 194. For clarity of illustration, input beams 190 and 192 are depicted as being offset from each other in combined beam 194. While some offset may exist, it is generally preferable to eliminate or at least minimize such offset. Thus, preferably, input beams 190 and 192 coincide with each other at filter 130 and are incident thereon at the same incidence angle. Although not shown in FIG. 1, one or both of surfaces 114 and 124 may include an antireflective coating to minimize power losses when input beams 190 and 192 enter and exit combiner 100. Refraction at surfaces 114 and 124 has been omitted for clarity of illustration.

Each of input beams 190 and 192 may be visible, ultraviolet, near-infrared, or mid-infrared. In one scenario, input beams 190 and 192 may be generated by respective lasers 170 and 172. Together, combiner 100 and lasers 170 and 172 form a system for generating a spectrally-combined laser beam. In one embodiment, lasers 170 and 172 are of the same type. For example, lasers 170 and 172 may be ytterbium-doped fiber lasers operating at different respective wavelengths in the range from 1030 to 1085 nm. In another scenario, at least one of input beams 190 and 192 is a combination of two laser beams, for example a combined beam 194 produced by a preceding instance of combiner 100. One or both of input beams 190 and 192 may have an average power of at least one kW, e.g., an average power in the range between 1 and 30 kW. In one implementation, the average power of at least one of inputs beams 190 and 192 exceeds 2.5 kW.

Figure 2:
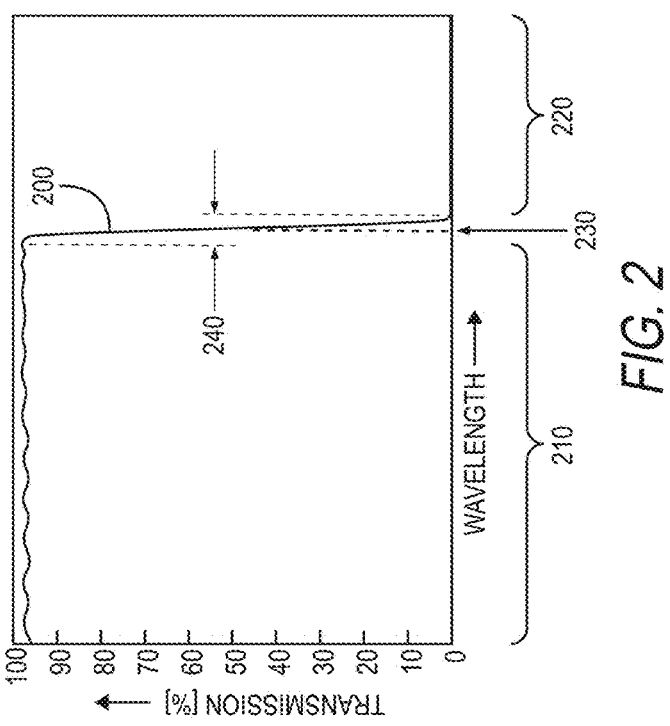
FIG. 2 shows the transmission curve for one exemplary low-pass embodiment of the dichroic filter of the dual-substrate dichroic beam combiner of FIG. 1.

FIG. 2 schematically shows the transmission curve 200 for one exemplary low-pass embodiment of filter 130. This embodiment of filter 130 is transmissive in a wavelength range 210 and reflective in a wavelength range 220. Wavelength ranges 210 and 220 are on opposite sides of a cut-off wavelength 230. The transmission exceeds 95% in transmission-wavelength-range 210 and is less than 1% in reflection-wavelength-range 220. The transition from transmission-wavelength-range 210 to reflection-wavelength-range 220 has a non-zero width 240. Transition width 240 may be in the range between 5 and 20 nm. Transition width 240 depends on the number of layers in filter 130. Specifically, a relatively high number of layers allows for a relatively narrow transition width 240.

Referring again to FIG. 1, a more general embodiment of filter 130 may transmit at least 95% of input beam 190 and reflect at least 95% of input beam 192. However, filter 130 absorbs a fraction of each of input beams 190 and 192. The absorbed fraction may be in the range between 20 and 1000 parts per million (ppm). A typical, commercially available high-pass or low-pass filter with a transition width 240 of approximately 10-15 nm is characterized by an absorption level in the range between 500 and 1000 ppm. Lower absorption levels, e.g., in the range between 20 and 200 ppm, may be achieved with a custom-made filter. When the total power of input beams 190 and 192 is several kW or higher, absorption in filter 130 may lead to significant heating of combiner 100. Due to finite thermal conductivity of substrates 110 and 120, this heating is nonuniform, with higher temperatures close to the location where input beams 190 and 192 propagate in filter 130 and lower temperatures further away from this location.

Figure 3:
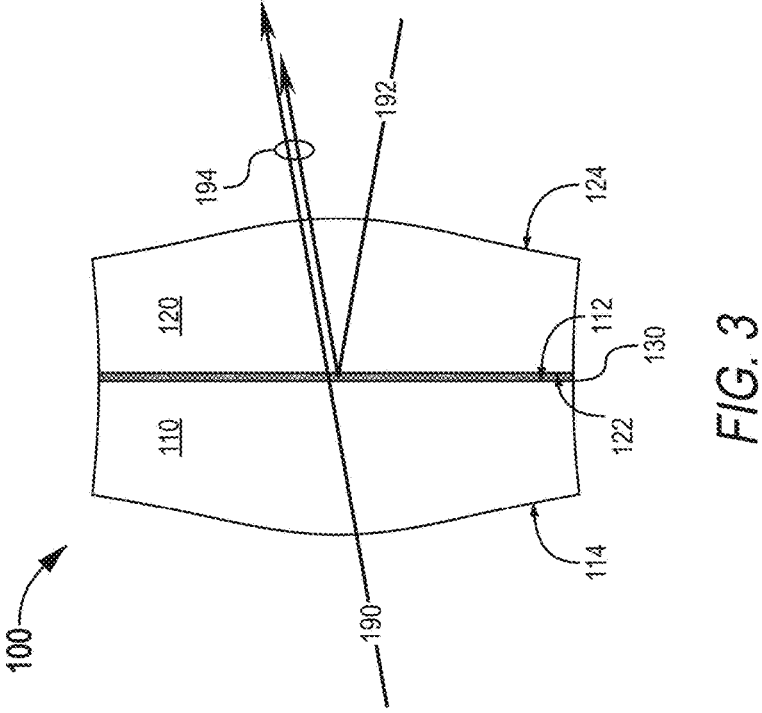
FIG. 3 shows an exemplary state of the dual-substrate dichroic beam combiner of FIG. 1 when heated by absorption of the input laser beams in the dichroic filter. Deformation due to thermal expansion is exaggerated.

FIG. 3 shows an exemplary state of combiner 100 when heated by absorption of input beams 190 and 192 in filter 130. Both of substrates 110 and 120 are deformed by thermal expansion. For clarity of illustration, the resulting deformation is exaggerated in FIG. 3. The thermal expansion leads to bulging of surfaces 114 and 124 but no deformation of surfaces 112 and 122. Additionally, the refractive index of substrates 110 and 120 changes locally due to a non-zero temperature coefficient of the refractive index, i.e., a non-zero thermo-optic coefficient dn/dT.

Figure 4:
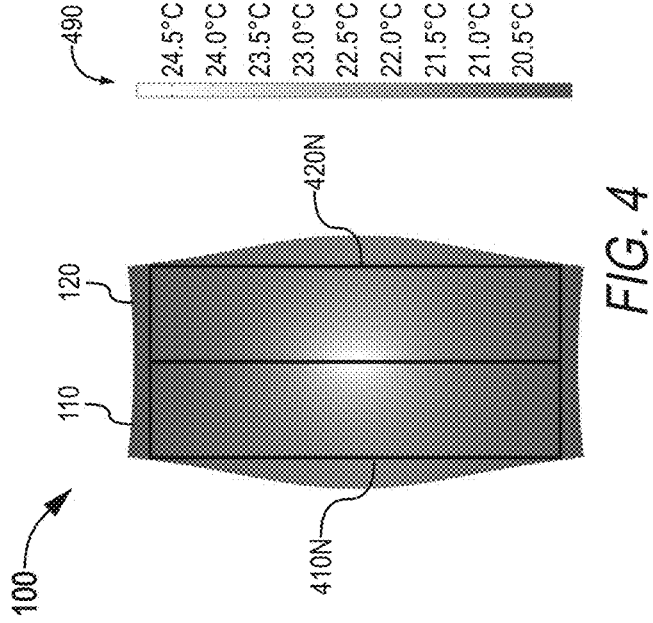
FIG. 4 shows simulated temperature profile and, in exaggerated form, thermal expansion of one embodiment of the dual-substrate dichroic beam combiner of FIG. 1 when heated by absorption of the input laser beams.

FIG. 4 shows a simulated temperature profile and thermal expansion of one embodiment of combiner 100 when heated by absorption of input beams 190 and 192 in filter 130. For clarity of illustration, the thermal expansion is exaggerated by approximately a factor of 5000 in FIG. 4. The nominal shapes and sizes of substrates 110 and 120 are indicated by respective outlines 410N and 420N. In this embodiment of combiner 100, each of substrates 110 and 120 is, nominally, a planar circular disk with a thickness of 3 mm and a diameter of 12.7 mm. In the simulated example, the total average laser power incident on dichroic beam combiner 100 is 10 kW, the absorption level in filter 130 is 120 ppm, and substrates 110 and 120 are made of fused silica. The ambient temperature is 20 degrees Celsius (° C.), such that the nominal temperature of combiner 100 is 20° C. At the location where input beams 190 and 192 intersect filter 130, the temperature rises to almost 25° C. (see temperature scale 490), while the temperature is only slightly elevated at the most distant edges of substrates 110 and 120.

Referring again to FIG. 3, the thermal expansion of substrates 110 and 120 causes dichroic beam combiner 100 to form a convex-convex lens for each of input beams 190 and 192. Because substrates 110 and 120 are identical, they respond in the same manner to heating caused by laser-light absorption in filter 130, and the interface between substrates 110 and 120 remains planar. In the case of input beam 190, surfaces 114 and 124 form the two convex surfaces of the convex-convex lens. For input beam 192, surface 124 forms both convex surfaces of the convex-convex lens. Because substrates 110 and 120 are identical, the convex surfaces experienced by input beams 190 and 192 have the same curvature and therefore subjects input beams 190 and 192 to the same optical power. The optical power stemming from the shape of the surfaces when subject to thermal expansion is positive.

Local temperature-induced changes to the refractive index of substrates 110 and 120 also contribute optical power. This effect is referred to as the thermo-optic effect. Again, because substrates 110 and 120 are identical, the thermo-optic effect also subjects input beams 190 and 192 to the same optical power. The relative importance of thermal expansion and the thermo-optic effect, in regard to optical power, depends on the material of substrates 110 and 120. In the case of fused silica, for example, the thermo-optic effect has a greater impact on optical power than thermal expansion.

The thermo-optic coefficient of substrates 110 and 120 may be positive or negative. When the thermo-optic coefficient is positive, heating increases the refractive index, which adds further positive optical power to the positive optical power of the convex-convex lens formed by surfaces 114 and 124. On the other hand, when the thermo-optic coefficient of substrates 110 and 120 is negative, the thermo-optic effect adds negative optical power. This negative optical power counteracts the positive optical power of the convex-convex lens formed by surfaces 114 and 124, and the total optical power of combiner 100 may be positive or negative. Whether the thermo-optic coefficient is positive or negative and whether the total optical power of combiner 100 is positive or negative, the symmetry between substrates 110 and 120 ensures that combiner 100 imposes the same optical power on input beams 190 and 192. This holds true even in the presence of temporal variation of the powers of input beams 190 and 192.

In a preferred use scenario, input beams 190 and 192 have the same focusing properties when incident on dichroic beam combiner 100. In this use scenario, dichroic beam combiner maintains common focusing properties of input beams 190 and 192 in combined beam 194. When input beams 190 and 192 are incident as collimated beams, combined beam 194 emerges from dichroic beam combiner 100 as a converging or diverging laser beam. (If substrates 110 and 120 are made of a material with a positive thermo-optic coefficient, such as fused silica or sapphire, combined beam 194 emerges as a converging laser beam.) However, since input beams 190 and 192 converge/diverge at the same rate in combined beam 194, combined beam 194 may be re-collimated or, e.g., brought to a focus at a particular location.

Figure 6:
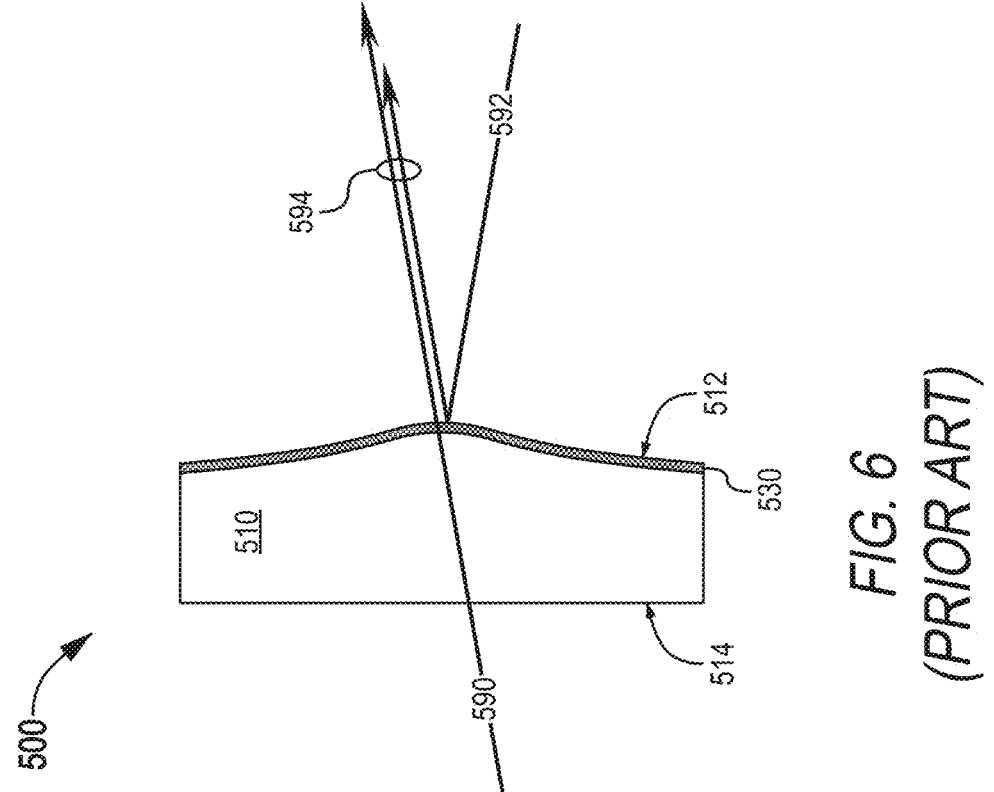
FIG. 6 shows the conventional single-substrate dichroic beam combiner of FIG. 5 when heated by absorption of the input laser beams in its dichroic filter.
Figure 5:
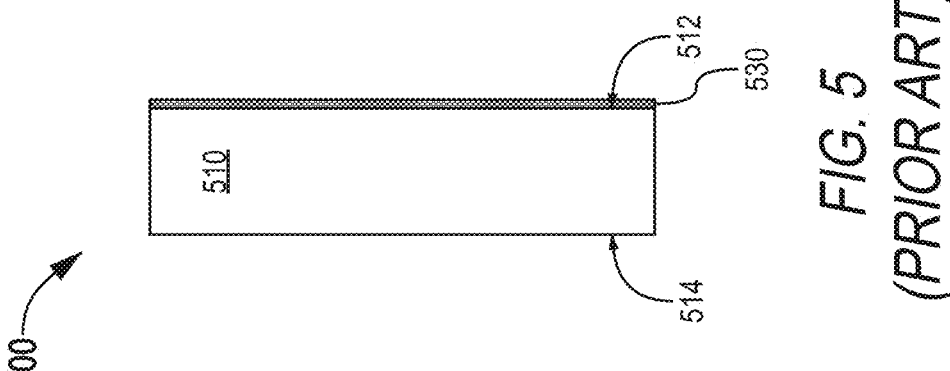
FIG. 5 shows a conventional single-substrate dichroic beam combiner in a nominal state.

FIGS. 5 and 6 illustrate a single-substrate conventional dichroic beam combiner 500 for combining input laser beams 590 and 592 into a combined laser beam 594. FIG. 5 shows conventional combiner 500 in a nominal state. Conventional combiner 500 consists of a single nominally-planar substrate 510 and a dichroic, thin-film interference filter 530 disposed on a surface 512 of substrate 510. Substrate 510 has a positive thermo-optic coefficient. Substrate 510 is, for example, made of fused silica.

FIG. 6 shows conventional combiner 500 when heated by absorption of input beams 590 and 592 in filter 530. Input beam 590 is transmitted by conventional combiner 500, while filter 530 reflects input beam 592. Finite thermal conductivity of substrate 510 causes the temperature of substrate 510 to be significantly higher at the location where input beams 590 and 592 intersect filter 530. Therefore, surface 512 bulges significantly more than the opposite-facing surface 514. In the depicted scenario, surface 514 remains planar.

Conventional combiner 500 forms a positive lens for input beam 590 due to the thermo-optic effect in substrate 510 and thermal expansion causing at least surface 512 to be convex. In contrast, input beam 592 is reflected by convex surface 512, which subjects input beam 592 to negative optical power. Thus, if input beams 590 and 592 are incident with identical focusing properties, their focusing properties will be different from each other in combined beam 594. As a result of such focusing discrepancy, it is impossible, or at least difficult, to collimate combined beam 594 or bring combined beam 594 to a clean focus at a desired location. The usefulness of conventional combiner 500 is therefore generally limited to laser powers low enough to avoid significant thermo-optic effect and/or thermal expansion.

By virtue of its dual-substrate design, the usefulness of combiner 100 is not limited by focusing discrepancies stemming from laser-light absorption in filter 130. Dual-substrate combiner 100 is therefore more suitable for combining a particularly high average-power than conventional single-substrate dichroic beam combiners such as conventional combiner 500. In one scenario, combiner 100 is capable of combining input beams 190 and 192 with a total average-power of more than 15 kW, while maintaining common focusing properties of input beams 190 and 192 in combined beam 194.

In one use scenario, a series of combiners 100 are used to combine more than two input laser beams. The cut-off wavelength 230 (see FIG. 2) typically, but not necessarily, either increases or decreases through the series. The first combiner 100 of the series generates a first combined beam 194, which serves as one of input beams 190 and 192 for the second combiner 100 of the series, etc. For comparison, consider a series of conventional single-substrate dichroic beam combiners implementing the same series of dichroic thin-film interference filters. In terms of combined power, the usefulness of this conventional series is limited by focusing discrepancies stemming from laser-light absorption in the dichroic filter of at least the last combiner of the series. This absorption-related limitation does not apply to the series of dual-substrate combiners 100.

In the series of dual-substrate combiners 100, the limiting factor may instead relate to the spectral properties of the filters 130, specifically the non-zero transition width 240 between transmission-wavelength-range 210 and reflection-wavelength-range 220. In embodiments where all input lasers sources are of the same type, the limiting factor may be how many different laser wavelengths can be generated by this same laser type while the separation between each pair of adjacent laser wavelengths exceeds the corresponding transition width 240. However, combiner 100 may be able to counter this transition-width-related limitation as well. Narrowing transition width 240 usually requires increasing the number of layers in the thin-film interference filter, which increases the absorption, especially for transmitted beams. While increased absorption would worsen focusing discrepancies when using conventional single-substrate dichroic beam combiners, increased absorption in filter 130 may be inconsequential when using dual-substrate combiners 100. Therefore, it may be possible to reduce transition width 240 in combiners 100, such that a higher number of different laser wavelengths from within the gain curve of the laser gain medium can be combined. Thus, while the primary benefit of combiner 100 is the ability to combine input beams 190 and 192 of relatively high total average-power, a secondary benefit (in at least some scenarios) is an increased number of combinable laser wavelengths. This secondary benefit may extend the usefulness of combiner 100 to even greater average powers.

Figure 7:
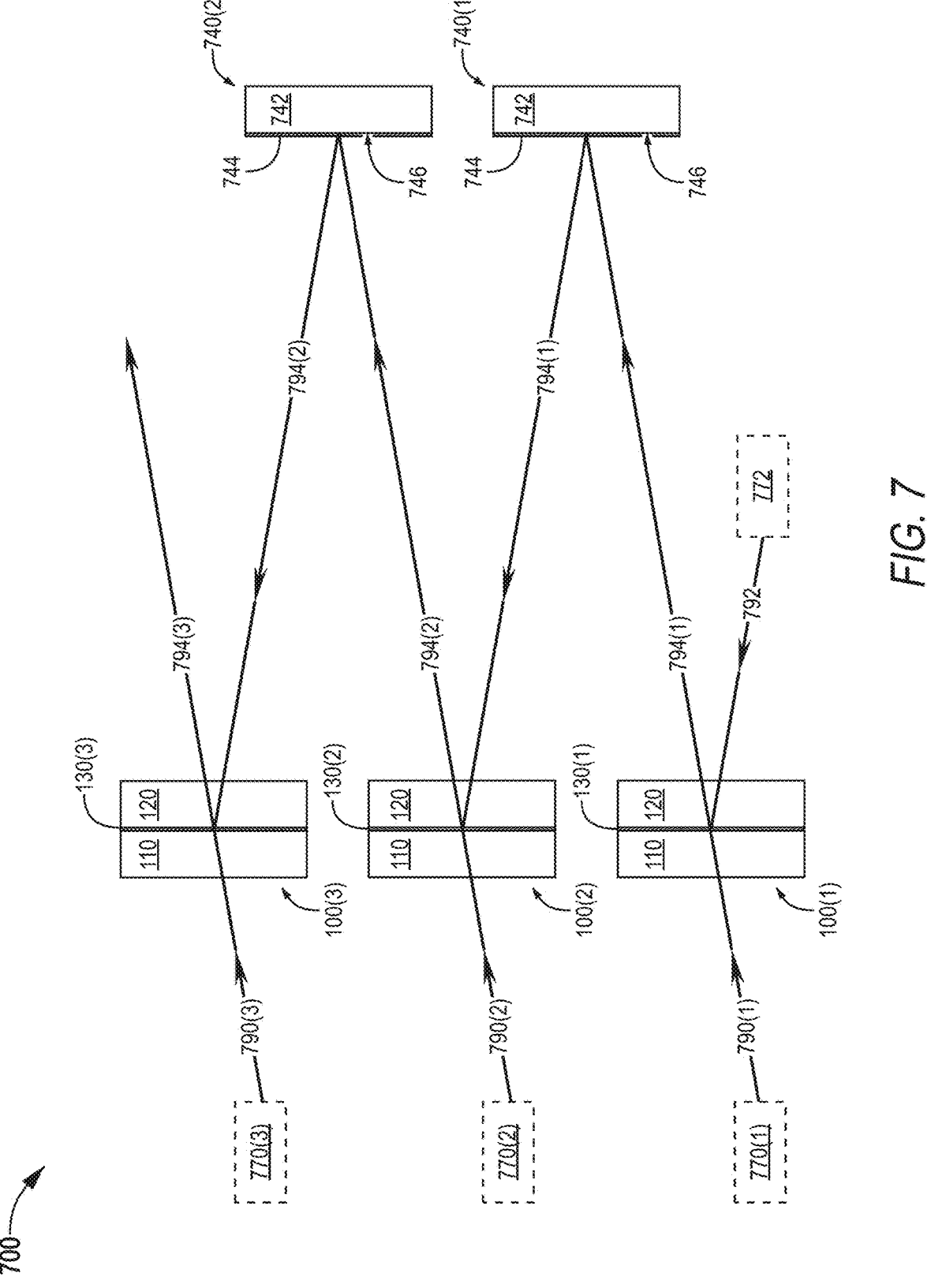
FIG. 7 illustrates a system for combining three or more collimated laser beams using a series of the dual-substrate dichroic beam combiners of FIG. 1 with focus correction between each pair of adjacent dual-substrate dichroic beam combiners of the series, according to an embodiment.

FIG. 7 illustrates one system 700 for combining three or more collimated laser beams using a series of combiners 100 with focus correction between each pair of adjacent combiners 100 of the series. In system 700, each combiner 100 is configured to form a positive lens, for both input beams incident thereon, when combiner 100 is heated by laser-light absorption in filter 130. Substrates 110 and 120 of each combiner 100 may be made of fused silica or sapphire. The depicted embodiment includes three combiners 100(1), 100 (2), and 100(3) to combine four laser beams. More generally, system 700 may include any number of combiners 100 greater than one. Combiners 100(1), 100(2), and 100(3) have respective filters 130(1), 130(2), and 130(3). In one implementation, filter 130 of each combiner 100 of the series is a low-pass filter, and cut-off wavelength 230 (see FIG. 2) decreases through the series. In another implementation, filter 130 of each combiner 100 of the series is a high-pass filter, and cut-off wavelength 230 increases through the series. It is also possible to configure filter 130 of one or more combiners 100 of the series as a bandpass filter, although this is likely an unnecessary complication.

Referring to the depicted embodiment with three combiners 100, the first combiner 100(1) combines two input laser beams 790(1) and 792 into a combined laser beam 794(1). Beams 790(1), 792, and 794(1) are respective examples of beams 190, 192, and 194 discussed above for single instances of combiner 100. The second combiner 100(2) combines an input laser beam 790(2) with combined beam 794(1), and the third combiner 100(3) combines an input laser beam 790(3) with combined beam 794(2).

Each of input beams 790(1-3) and 792 is collimated when incident on the corresponding combiner 100. Herein, a laser beam is considered "collimated" at locations along its propagation path that are within one Rayleigh range of a beam waist. When combiners 100 of system 700 are heated by laser-light absorption in filter 130, combined beams 794(1-3) emerge from the respective combiners 100(1-3) as converging laser beams. In order to ensure that combined beams 794(1) and 794(2) are collimated when incident on the respective combiners 100(2) and 100(3), the depicted embodiment of system 700 further includes re-collimating reflectors 740(1) and 740(2). Reflector 740(1) reflects combined beam 794(1) toward combiner 100(2) and re-collimates combined beam 794(1). Reflector 740(2) reflects combined beam 794(2) toward combiner 100(3) and re-collimates combined beam 794(2). More generally, when system 700 is configured with any number of combiners 100 greater than two, system 700 includes a re-collimating reflector 740 between each pair of combiners 100 adjacent to each other in the series.

System 700 may further include lasers that generate the input laser beams. For example, the depicted embodiment of system 700 configured with three combiners 100 may include lasers 770(1-3) and 772 that generate input beams 790(1-3) and 792, respectively. The lasers generating the input laser beams may all be of the same type. For example, each of these lasers may be an ytterbium-doped fiber laser configured to generate a laser beam with a wavelength in the range between 1030 and 1085 nm. By virtue of combiners 100 and reflectors 740 cooperating to prevent focusing discrepancies in the presence of laser-light absorption in dichroic filters 130, system 700 is useful for combining a relatively high total average-power, for example more than 15 kW.

In one embodiment of system 700, each combined laser beam 794 subject to further combination by a subsequent combiner 100 in the series is reflected by this subsequent combiner 100, as depicted in FIG. 7. Without departing from the scope hereof, system 700 may be configured such that at least one combiner 100 instead transmits a combined laser beam 794 produced by a preceding combiner 100.

Each reflector 740 may include a substrate 742 with a reflective coating 744. It may be advantageous to position reflective coating 744 on the surface 746 of substrate 742 facing the combined beam 794 incident thereon, such that combined beam 794 does not propagate in substrate 742.

In one embodiment, each reflector 740 has negative optical power and the propagation distance of the incident combined beam 794 from the preceding combiner 100 is less than the focal length of the positive lens formed by this combiner 100. In this embodiment, reflective coating 744 may be disposed on surface 746, with surface 746 being concave (at least during operation). Alternatively, one or more reflectors 740 of system 700 has positive optical power and is positioned at a greater propagation distance from the preceding combiner 100 after the focus location of the corresponding combined beam 794. However, this alternative configuration will likely increase the overall size of system 700.

Regardless of the whether reflector(s) 740 have negative or positive optical power, optimal re-collimation of combined beam(s) 794 is achieved when the optical power of each reflector 740 is matched to the optical power of the positive lens formed by the preceding dichroic beam combiner 100, at least to within some acceptable tolerance.

When operating at high average laser powers, absorption of a small fraction of a combined beam 794 in reflective coating 744 of the corresponding reflector 740 may lead to local thermal expansion of substrate 742. Therefore, at high average laser powers, the optical power of reflector(s) 740 may be sensitive to the incident laser power. In one scenario, system 700 is configured to operate at a fixed set of input powers. In this fixed-operation-point scenario, each reflector 740 may be a rigid optical element with a fixed optical power. However, adjustability or adaptability of the optical power of reflector(s) 740 is beneficial in scenarios where at least one of the input powers of system 700 is variable or a priori unknown. In one embodiment, the optical power of reflector 740 is temperature sensitive and automatically adapts to the power of combined beam 794 incident thereon. One example of this embodiment is discussed below in reference to FIG. 8. In another embodiment, reflector 740 is an actively adjustable adaptive mirror, for example as discussed below in reference to FIG. 9.

Figure 8:
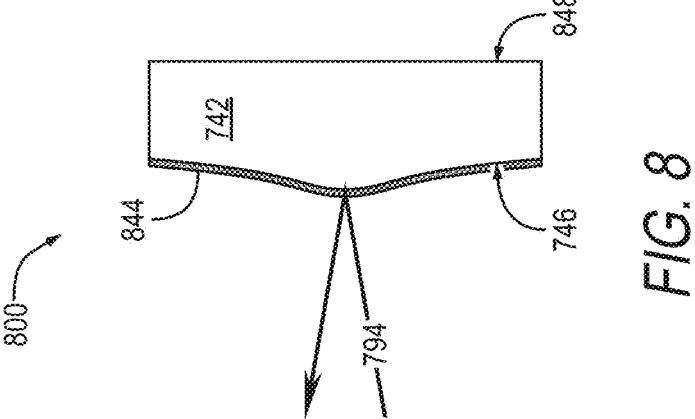
FIG. 8 illustrates a reflector with adaptable negative optical power that may be implemented in the FIG. 7 system to re-collimate combined laser beams forwarded from one dual-substrate dichroic beam combiner to another dual-substrate dichroic beam combiner, according to an embodiment.

FIG. 8 illustrates one reflector 800 with passively adaptable negative optical power. Reflector 800 is an embodiment of reflector 740 of system 700. Reflector 800 includes substrate 742 and a reflective coating 844 disposed on surface 746. Coating 844 is configured to absorb a fraction of combined beam 794 incident thereon in system 700. This absorption leads to thermal expansion of substrate 742. For a nominally planar surface 746, for example, the thermal expansion results in surface 746 being convex. A nominally convex surface 746 is rendered more convex by the thermal expansion, and a nominally concave surface 746 is rendered less concave, or even convex or planar. Coating 844 is an embodiment of coating 744 and may be a thin-film dielectric coating.

The composition of coating 844 is designed such that the absorption level leads to a convex curvature of surface 746 that re-collimates combined beam 794. The convex curvature of surface 746 automatically adapts to different focusing properties of combined beam 794 because these focusing properties are determined by the power of combined beam 794. When combined beam 794 has relatively low power, the positive lens in the combiner 100 that produces combined beam 794 is relatively weak, and combined beam 794 is only relatively mildly converging. The relatively low power of combined beam 794 also induces only a relatively mild convex curvature of surface 746. On the other hand, when the power of combined beam 794 is high, the positive lens in the combiner 100 that produced combined beam 794 is strong, combined beam 794 converges more strongly, and surface 746 is more strongly convex.

In an alternative scenario, not depicted in FIG. 8, reflector 800 is operated to have adaptable positive optical power. In this alternative scenario, substrate 742 is transmissive, and combined beam 794 is instead incident on surface 848. Combined beam 794 then propagates through substrate 742 before being reflected by coating 844. In this scenario, laser-light absorption in coating 844 results in thermal expansion similar to the one discussed in reference to the depicted embodiment. In addition, laser-light absorption in coating 844 induces a thermo-optic effect in substrate 742. At least if substrate 742 has a positive thermo-optic coefficient, both the thermo-optic effect and thermal expansion contribute to an adaptive optical power of reflector 800 that is positive.

Figure 9:
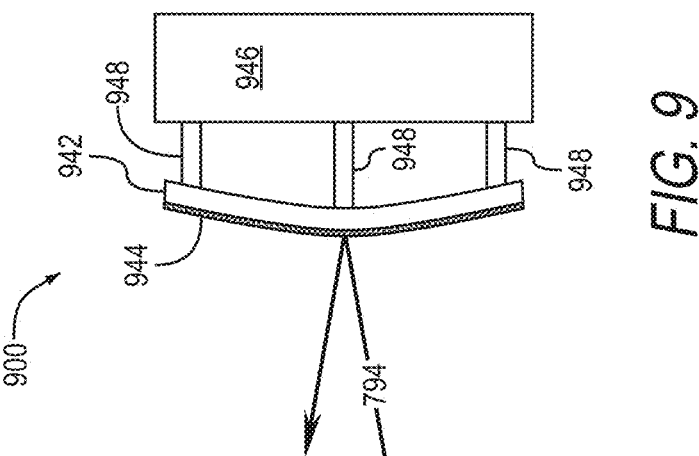
FIG. 9 illustrates a reflector with actively adjustable optical power, according to an embodiment. This reflector may be implemented in the FIG. 7 system to re-collimate combined laser beams forwarded from one dual-substrate dichroic beam combiner to another dual-substrate dichroic beam combiner.

FIG. 9 illustrates one reflector 900 that has actively adjustable optical power. Reflector 900 is an embodiment of reflector 740. Reflector 900 includes a deformable substrate 942 with a reflective coating 944. When reflector 900 is implemented in system 700, coating 944 reflects combined beam 794. Deformable substrate 942 is connected to a more rigid base 946 via a plurality of standoffs 948. One or more of standoffs 948 have adjustable length, such that the shape of deformable substrate 742 is adjustable. In operation, the lengths of the one or more adjustable standoffs are adjusted to adapt to the focusing properties of combined beam 794, so as to re-collimate combined beam 794. In the depicted example, a central standoff 948 is made longer than two peripheral standoffs 948, such that the surface of deformable substrate 942 carrying coating 944 is convex.

Reflector 900 is only one example of an actively-adjustable reflector that may be implemented in system 700. Many other types of actively-adjustable reflectors known in the art are suitable as well.

Referring again to FIG. 7, combiners 100 of system 700 may be modified to implement substrates 110 and 120 with a negative thermo-optic coefficient that cause combiners 100 to form negative (instead of positive) lenses when heated by laser-light absorption in filters 130. In this modification, reflector(s) 740 are configured to have positive optical power. Reflector 740 may, in this case, be (a) a rigid concave reflector, (b) an actively-adjustable, adaptive concave reflector similar to reflector 900 apart from being adjusted to form a concave reflector, or (c) reflector 800 operated with combined beam 794 incident on surface 848 and with a material choice for substrate 742 that ensures positive optical power.

The above discussion of dichroic beam combiner 100 assumes that substrates 110 and 120 are identical nominally-planar substrates. However, dichroic beam combiner 100 may be generalized to configurations where substrates 110 and 120 differ from each other and/or are nominally nonplanar but, yet, cooperate to subject input beams 190 and 192 to the same optical power. In one such generalization of dichroic beam combiner 100, substrates 110 and 120 are identical, but surfaces 114 and 124 are nominally curved with the curvature being either convex or concave.

In another such generalization, substrates 110 and 120 differ from each other in size and/or shape in peripheral areas where laser-induced heating effects are negligible. It is also possible to utilize different materials for substrates 110 and 120. For example, substrates 110 and 120 may be made of (a) different materials with similar thermal properties or (b) different materials with different respective thermal properties and also different respective thickness to compensate for the differences in thermal properties. It is also possible to relax the requirement that substrates 110 and 120, when identical in size and shape, have identical and mutually aligned footprints on the interface between substrates 110 and 120. For example, a small transverse shift of substrate 110 relative to substrate 120 is likely inconsequential.

In a further extension of dichroic beam combiner 100, substrates 110 and 120 differ from each other in one or more of material, size, shape, and transverse positioning but still form a lens for each of input beams 190 and 192. The difference(s) between substrates 110 and 120 are such that the lens experienced by input beam 190 has a different optical power than that experienced by input beam 192 but the imposed optical power has the same sign for input beam 190 as for input beam 192. Even this extension of dichroic beam combiner 100 may present a useful improvement over conventional single-substrate beam combiners.

Depending on at least material choices for substrates 110 and 120, laser-light absorption of input beams in substrates 110 and 120 may play a role as well. This effect is expected to be relatively insignificant for most materials commonly used in transmitting optical elements in high-average-power laser systems, e.g., fused silica and sapphire. In embodiments where laser-light absorption in substrates 110 and 120 induces non-negligible optical power, some degree of focusing discrepancy between input beams 190 and 192 may arise. For example, a positive optical power induced in substrate 120 may exceed a positive optical power induced in substrate 110, in which case input beam 192 is focused more strongly than input beam 190. Yet, by virtue of the heat transport between substrates 110 and 120 being more effective than heat transport between a single substrate and air, this focusing discrepancy is smaller than that produced in a conventional single-substrate dichroic beam combiner, such as single-substrate combiner 500.

The present invention is described above in terms of a preferred embodiment and other embodiments. The invention is not limited, however, to the embodiments described and depicted herein. Rather, the invention is limited only by the claims appended hereto.

What is claimed is:

1. A system for generating a spectrally-combined laser beam, comprising:
   a first laser configured to generate a first laser beam;
   a second laser configured to generate the second laser beam, at least one of the first laser and the second laser is configured to generate the corresponding laser beam with an average power of at least 2.5 kilowatts; and
   a dichroic beam combiner comprising
      two substrates; and
      a dichroic thin-film filter coated at a nominally planar interface between the substrates, the dichroic thin-film filter being transmissive in a transmission-wavelength-range and reflective in a reflection-wavelength-range, wherein the dichroic thin-film filter is configured to combine, into a combined laser beam, the first and second input laser beams that (a) have wavelengths in the transmission-wavelength-range and reflection-wavelength-range, respectively, and (b) are incident on the dichroic thin-film filter of the dichroic beam combiner from opposite respective sides thereof;

wherein the substrates are configured to, when heated by absorption of the first laser beam and the second laser beam in the dichroic thin-film filter, form a first lens for the first input laser beam and a second lens for the second input laser beam, the first and second lenses being either (a) both negative or (b) both positive.

2. The system of claim 1, wherein each of the first laser and the second laser is configured to generate the corresponding input laser beam with an average power of at least 2.5 kilowatts.

3. The system of claim 1, wherein the first and second lenses have the same optical power.

4. The system of claim 3, wherein each of the first and second lenses has positive optical power.

5. The system of claim 1, wherein the first and second lenses are at least partly caused by bulging of surfaces of the two substrates facing away from the planar interface.

6. The system of claim 1, wherein the two substrates are nominally planar in a dimension parallel to the planar interface.

7. The dichroic beam combiner of claim 6, wherein the two substrates are made of the same material and have the same nominal thickness orthogonally to the nominally planar interface.

8. The system of claim 7, wherein outlines of respective projections of the two substrates onto the nominally planar interface therebetween are identical in both shape and location at the same position.

9. A system for combining three or more collimated laser beams, comprising:

a series of instances of a dichroic beam combiner comprising:

two substrates; and a dichroic thin-film filter coated at a nominally planar interface between the substrates, the dichroic thin-film filter being transmissive in a transmission-wavelength-range and reflective in a reflection-wavelength-range, whereby the dichroic thin-film filter is configured to combine, into a combined laser beam, first and second input laser beams that (a) have wavelengths in the transmission-wavelength-range and reflection-wavelength-range, respectively, and (b) are incident on the dichroic thin-film filter of the dichroic beam combiner from opposite respective sides thereof;

wherein the substrates are configured to, when heated by absorption of the input laser beams in the dichroic thin-film filter, form a first lens for the first input laser beam and a second lens for the second input laser beam, the first and second lenses being either (a) both negative or (b) both positive; and for each pair of dichroic beam combiners adjacent to each other in the series, a respective reflector arranged to (a) collimate the combined laser beam produced by a first dichroic beam combiner of the pair and (b) reflect the combined laser beam toward a second dichroic beam combiner of the pair, whereby the combined laser beam produced by the first dichroic beam combiner of the pair forms one of the first and second input laser beams for the second dichroic beam combiner of the pair.

10. The system of claim 9, wherein at least one of the reflectors includes:

a substrate having a front surface facing the combined laser beam incident on the reflector; and a reflective coating disposed on the front surface, the reflective coating being partly absorptive to the combined laser beam incident thereon, whereby an optical power of the reflector, caused by thermal expansion of the substrate induced by absorption of the combined laser beam in the reflective coating, is passively adaptable to a power of the combined laser beam.

11. The system of claim 9, wherein at least one of the reflectors has actively adjustable optical power.

12. The system of claim 9, wherein for each dichroic beam combiner of the series, the first and second lenses are positive lenses having the same optical power, whereby the first and second lenses are configured to focus the first and second input laser beams by the same amount when the dichroic beam combiner is heated by absorption of the first and second input laser beams in the dichroic thin-film filter.

13. The system of claim 12, wherein, for each pair of dichroic beam combiners adjacent to each other in the series, a propagation distance of the combined laser beam from the first dichroic beam combiner of the pair to the reflector is less than a focal length of the positive lenses formed by the non-last dichroic beam combiner when heated by the absorption of the first and second input laser beams in the dichroic thin-film filter thereof.

14. The system of claim 9, wherein each non-first dichroic beam combiner of the series is configured to reflect the combined laser beam produced by the immediately preceding dichroic beam combiner of the series.

15. A system for generating a spectrally-combined laser beam, comprising:

the system of claim 9;

two laser sources configured to generate the first and second input laser beams for the first dichroic beam combiner of the series; and for each non-first dichroic beam combiner of the series, an additional laser source configured to generate the one of the corresponding first and second input laser beams that is not the combined laser beam produced by an immediately preceding dichroic beam combiner of the series.

16. The system of claim 15, wherein the combined laser beam produced by a last dichroic beam combiner of the series has an average power of more than 15 kilowatts.

17. The system of claim 15, wherein each of the laser sources is configured to generate the corresponding laser beam with a power of at least 2.5 kilowatts.

18. The system of claim 9, wherein in each beam combiner the first and second lenses have the same optical power.

19. The system of claim 9, wherein in each beam combiner the two substrates are nominally planar.

20. The system of claim 19, wherein the two substrates are made of the same material and have the same nominal thickness orthogonally to the nominally planar interface.

* * * * *